(12) United States Patent
Bengali et al.

(10) Patent No.: US 9,646,042 B2
(45) Date of Patent: May 9, 2017

(54) DATA CONSISTENCY AND ROLLBACK FOR CLOUD ANALYTICS

(71) Applicant: Dell Products L.P., Round Rock, TX (US)

(72) Inventors: Ketan Bengali, Sunnyvale, CA (US); Kaniska Mandal, Sunnyvale, CA (US); Alex J. Chen, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 43 days.

(21) Appl. No.: 14/862,007

(22) Filed: Sep. 22, 2015

(65) Prior Publication Data
US 2016/0085794 A1    Mar. 24, 2016

Related U.S. Application Data

(63) Continuation of application No. 13/764,446, filed on Feb. 11, 2013, now Pat. No. 9,141,680.

(51) Int. Cl.
*G06F 17/00* (2006.01)
*G06F 17/30* (2006.01)
*G06F 11/14* (2006.01)

(52) U.S. Cl.
CPC .... *G06F 17/30371* (2013.01); *G06F 11/1469* (2013.01); *G06F 17/30563* (2013.01); *G06F 2201/80* (2013.01)

(58) Field of Classification Search
CPC ......... G06F 17/30371; G06F 17/30563; G06F 11/1469; G06F 2201/80
USPC ......................................................... 707/602
See application file for complete search history.

(56) References Cited

U.S. PATENT DOCUMENTS

| | | | |
|---|---|---|---|
| 5,325,519 | A | 6/1994 | Long et al. |
| 5,729,743 | A | 3/1998 | Squibb |
| 6,035,298 | A | 3/2000 | McKearney |
| 6,092,083 | A | 7/2000 | Brodersen et al. |
| 6,212,524 | B1 | 4/2001 | Weissman et al. |
| 6,321,374 | B1 | 11/2001 | Choy |

(Continued)

FOREIGN PATENT DOCUMENTS

| | | |
|---|---|---|
| EP | 2 837 158 | 2/2015 |
| WO | WO 00/68841 | 11/2000 |

(Continued)

OTHER PUBLICATIONS

Lomet, David, et al., "Unbundling Transaction Services in the Cloud", CIDR Perspectives 2009, Asilomar, CA, Jan. 4-7, 2009, 10 pages.*

(Continued)

*Primary Examiner* — Robert Stevens
(74) *Attorney, Agent, or Firm* — Polsinelli LLP

(57) ABSTRACT

An extract-transform-load (ETL) platform fetches consistent datasets in a batch for a given period of time and provides the ability to rollback that batch. The batch may be fetched for an interval of time, and the ETL platform may fetch new or changed data from different cloud/on-premise applications. It will store this data in the cloud or on-premise to build data history. As the ETL platform fetches new data, the system will not overwrite existing data, but rather will create new versions so that change history is preserved. For any reason, if businesses would like to rollback data, they could rollback to any previous batch.

8 Claims, 5 Drawing Sheets

(56) References Cited

U.S. PATENT DOCUMENTS

| | | |
|---|---|---|
| 6,367,077 B1 | 4/2002 | Brodersen et al. |
| 6,405,219 B2 | 6/2002 | Saether et al. |
| 6,493,744 B1 | 12/2002 | Emens et al. |
| 6,573,907 B1 | 6/2003 | Madrane |
| 6,631,374 B1 | 10/2003 | Klein et al. |
| 6,711,593 B1 | 3/2004 | Gordon et al. |
| 6,721,765 B2 | 4/2004 | Ghosh et al. |
| 6,721,767 B2 | 4/2004 | De Meno et al. |
| 6,732,095 B1 | 5/2004 | Warshavsky et al. |
| 6,775,681 B1 | 8/2004 | Ballamkonda et al. |
| 7,076,496 B1 | 7/2006 | Ruizandrade |
| 7,191,183 B1 | 3/2007 | Goldstein |
| 7,225,249 B1 | 5/2007 | Barry et al. |
| 7,249,118 B2 | 7/2007 | Sandler et al. |
| 7,290,166 B2 | 10/2007 | Rothman et al. |
| 7,487,173 B2 | 2/2009 | Medicke et al. |
| 7,546,312 B1 | 6/2009 | Xu et al. |
| 7,640,264 B1 | 12/2009 | Chaulk et al. |
| 7,657,887 B2 | 2/2010 | Kothandaraman et al. |
| 7,752,172 B2 | 7/2010 | Boylan et al. |
| 7,779,039 B2 | 8/2010 | Weissman et al. |
| 7,827,350 B1 | 11/2010 | Jiang et al. |
| 7,895,474 B2 | 2/2011 | Collins et al. |
| 8,161,010 B2 | 4/2012 | Weissman et al. |
| 8,200,628 B2 | 6/2012 | An et al. |
| 8,335,264 B2 | 12/2012 | Suzumura |
| 8,423,524 B1 | 4/2013 | Rana et al. |
| 8,825,593 B2 | 9/2014 | Dodds et al. |
| 8,832,651 B2 | 9/2014 | Kibbar |
| 8,874,508 B1 | 10/2014 | Mittal |
| 8,972,405 B1 | 3/2015 | Chaulk et al. |
| 9,141,680 B2 | 9/2015 | Bengali |
| 9,191,432 B2 | 11/2015 | Bengali |
| 9,442,993 B2 | 9/2016 | Tung |
| 2003/0046422 A1 | 3/2003 | Narayanan et al. |
| 2004/0039879 A1 | 2/2004 | Gaither |
| 2004/0078516 A1 | 4/2004 | Henderson et al. |
| 2004/0236786 A1 | 11/2004 | Medicke et al. |
| 2004/0254964 A1 | 12/2004 | Kodama et al. |
| 2006/0047780 A1 | 3/2006 | Patnude |
| 2007/0250480 A1 | 10/2007 | Najork |
| 2007/0282806 A1 | 12/2007 | Hoffman et al. |
| 2008/0077613 A1 | 3/2008 | Hay et al. |
| 2008/0120618 A1 | 5/2008 | Collins et al. |
| 2008/0276239 A1 | 11/2008 | Collins et al. |
| 2008/0281918 A1 | 11/2008 | Kirkwood |
| 2008/0285738 A1 | 11/2008 | Misra et al. |
| 2009/0024915 A1 | 1/2009 | Cudich et al. |
| 2009/0049288 A1 | 2/2009 | Weissman |
| 2009/0055439 A1 | 2/2009 | Pai et al. |
| 2009/0063557 A1 | 3/2009 | Macpherson |
| 2009/0064147 A1 | 3/2009 | Beckerle et al. |
| 2009/0171927 A1 | 7/2009 | Nesamoney et al. |
| 2009/0279613 A1 | 11/2009 | Suzumura |
| 2009/0285067 A1 | 11/2009 | Chen et al. |
| 2009/0299987 A1 | 12/2009 | Willson |
| 2009/0313436 A1 | 12/2009 | Krishnaprasad et al. |
| 2009/0327311 A1 | 12/2009 | Becker |
| 2010/0005013 A1 | 1/2010 | Uriarte |
| 2010/0005055 A1 | 1/2010 | An et al. |
| 2010/0087935 A1 | 4/2010 | Pettus et al. |
| 2010/0138615 A1 | 6/2010 | Klaiber et al. |
| 2010/0211548 A1 | 8/2010 | Ott et al. |
| 2010/0229082 A1 | 9/2010 | Karmarkar et al. |
| 2011/0072212 A1 | 3/2011 | Kojima |
| 2011/0125705 A1 | 5/2011 | Aski et al. |
| 2011/0126168 A1 | 5/2011 | Ilyayev |
| 2011/0145499 A1 | 6/2011 | Ananthanarayanan et al. |
| 2011/0161946 A1 | 6/2011 | Thomson et al. |
| 2011/0246449 A1 | 10/2011 | Collins et al. |
| 2011/0258178 A1 | 10/2011 | Eidson et al. |
| 2011/0302583 A1 | 12/2011 | Abadi et al. |
| 2012/0005153 A1 | 1/2012 | Ledwich et al. |
| 2012/0023109 A1 | 1/2012 | Sternemann et al. |
| 2012/0110566 A1 | 5/2012 | Park |
| 2012/0150791 A1 | 6/2012 | Willson |
| 2012/0221608 A1 | 8/2012 | An et al. |
| 2012/0246118 A1 | 9/2012 | Feng et al. |
| 2012/0254111 A1 | 10/2012 | Carmichael |
| 2012/0259852 A1 | 10/2012 | Aasen et al. |
| 2012/0259894 A1 | 10/2012 | Varley et al. |
| 2013/0018904 A1 | 1/2013 | Mankala et al. |
| 2013/0019235 A1 | 1/2013 | Tamm |
| 2013/0055232 A1 | 2/2013 | Rajan et al. |
| 2013/0073513 A1 | 3/2013 | Kemper et al. |
| 2013/0073573 A1 | 3/2013 | Huang et al. |
| 2013/0080413 A1 | 3/2013 | Chen et al. |
| 2013/0212042 A1 | 8/2013 | Rosenberg |
| 2013/0238641 A1 | 9/2013 | Mandelstein et al. |
| 2013/0275612 A1 | 10/2013 | Voss et al. |
| 2014/0006580 A1 | 1/2014 | Raghu |
| 2014/0006581 A1 | 1/2014 | Raghu |
| 2014/0013315 A1 | 1/2014 | Genevski et al. |
| 2014/0019488 A1 | 1/2014 | Wo et al. |
| 2014/0074771 A1 | 3/2014 | He et al. |
| 2014/0149494 A1 | 5/2014 | Markley et al. |
| 2014/0149591 A1 | 5/2014 | Bhattacharya et al. |
| 2014/0156806 A1 | 6/2014 | Karpistsenko et al. |
| 2014/0172775 A1 | 6/2014 | Niehoff et al. |
| 2014/0223100 A1 | 8/2014 | Chen |
| 2014/0229423 A1 | 8/2014 | Bengali |
| 2014/0229511 A1 | 8/2014 | Tung |
| 2014/0229577 A1 | 8/2014 | Bengali |
| 2014/0229628 A1 | 8/2014 | Mandal |
| 2014/0359771 A1 | 12/2014 | Dash et al. |
| 2016/0065651 A1 | 3/2016 | Bengali |

FOREIGN PATENT DOCUMENTS

| | | |
|---|---|---|
| WO | WO 2014/123564 | 8/2014 |
| WO | WO 2014/123565 | 8/2014 |

OTHER PUBLICATIONS

U.S. Appl. No. 13/762,028; Office Action mailed Mar. 31, 2016, 29 pages.
U.S. Appl. No. 14/936,503; Office Action mailed Apr. 21, 2016, 5 pages.
Liu, Hui, et al.; "Data Storage Schema Upgrade via Metadata Evolution in Seas", CECNet 2012, Yichang, China, Apr. 21-23, 2012, pp. 3148-3151.
European Patent Application No. 13874570.8 Extended EP Search Report dated Jul. 27, 2016, 6 pages.
U.S. Appl. No. 13/762,028; Final Office Action mailed Sep. 1, 2016, 35 pages.
European Patent Application No. 13874789.4 Extended EP Search Report dated Sep. 15, 2016, 12 pages.
Aulbach, Stefan, et al., "A comparison of Flexible Schemas for Software as a Service", SIGMOD '09, Providence, RI, Jun. 29-Jul. 2, 2009, pp. 881-888.
Aulbach, Stefan, et al., "Multi-Tenant Databases for Software as a Service: Schema-Mapping Techniques", SIGMOD '08, Vancouver, BC, Canada, Jun. 9-12, 2008, pp. 1195-1206.
Bobrowski, Steve, "Optimal Multi-tenant Designs for Cloud Apps", CLOUD 2011, Washington, DC, Jul. 4-9, 2011, pp. 654-659.
Brandt, Cynthia A., et al.; "Meta-driven creation of data marts from EAV-Modeled clinical research database", International Journal of Medical Informatics, vol. 65, Issue 3, Nov. 12, 2002. pp. 225-241.
Casati, Frank, et al., "A Generic solution for Warehousing Business Process Data", VLDB '07, Vienna, Austria, Sep. 23-28, 2007. pp. 1128-1137.
Chaudhuri, Surajit, et al., "An Overview of Business Intelligence Technology", Communications of the ACM, vol. 54, No. 8, Aug. 2011, pp. 88-98.
Chong, Frederick, et al., "Multi-Tenant Data Architecture", Microsoft Corp., Jun. 2006, pp. 1-15.
Curino, Carlo, et al., "Automating Database Schema Evolution in Information System Upgrades", HotSWUp '09, Orlando, FL, Oct. 25, 2009, 5 pages.

(56) References Cited

OTHER PUBLICATIONS

Domingo, Enrique Jimenez, et al., "CLOUDIO: A Cloud Computing-oriented Multi-Tenant Architecture for Business Information Systems", 2010 IEEE 3rd Intl Conf. on Cloud Computing, IEEE Computer Society, © 2010, pp. 532-533.
Gao, Bo, et al., "A Non-Intrusive Multi-tenant Database for Large Scale SaaS Applications", ICEBE 2011, Beijing, China, Oct. 19-21, 2011, pp. 324-328.
Google Scholar, "Streaming data cloud metadata" Date of download: Nov. 3, 2014 http://scholar.googl.com/scholar?=streaming+data+cloud+metadata&btnG+32 &hl=en&as_sdt=0%C47.
Grund, Martin, et al., "Shared Table Access Pattern Analysis for Multi-Tenant Applications", AMIGE 2008, Tianjin, China, 2008, pp. 1-5.
Han, Jung-Soo, et al.; "Integration Technology of Literature Contents based on SaaS", ICISA 2011, Jeju Island, Korea, Apr. 26-29, 2011, pp. 1-5.
Hill, Phil, "Clarification on Cloud, SaaS and Multi-tenant Language", e-Literate, Sep. 10, 2012, pp. 1-7.
Jun, Yang, "A Modern Service Oriented Unit-Based Distributed Storage Model for Peer Nodes", IC-BNMT 2009, Beijing, China, Oct. 18-20, 2009, pp. 659-663.
Kwok, Thomas, et al., "A Software as a Service with Multi-Tenancy Support for an Electronic Contract Management Application", 2008 IEEE Intl Conf. On Service Computing, IEEE Computer Society, © 2008, pp. 179-186.
Momm, Christof, et al., "A Qualitative Discussion of Different Approaches for Implementing Multi-Tenant SaaS Offerings", Software Engineering (Workshops), vol. 11, © 2011, pp. 139-150.
"Multi-tenancy", WhatIs.com, Apr. 5, 2011, 1 page.
"Multitenancy", Wikipedia, downloaded from: en.wikipedia.org/wiki/Multi-tenant on Oct. 3, 2014, pp. 1-5.
Nadkami, Parkash M., "Metadata for Data Warehousing", Meta-Driven Software Systems in Biomedicine, Health Informatics 2011, Apr. 29, 2011, pp. 359-372.
Park, Kyounghyun, et al., "SaaSpia Platform: Integrating and Customizing On-Demand Applications Supporting Multi-tenancy", ICACT 2012, PyeongChang, Korea, Feb. 19-22, 2012, pp. 961-964.
Schaffner, Jan. et al., "Towards Analytics-as-a-Service Using an In-Memory Column Database", Information and Software as Services, LNBIP 74, Springer-Verlag, Berlin, German, © 2011, pp. 257-282.
"Schema", Microsoft Computer Dictionary, 5th Edition, Microsoft Press, Redmond, WA, © 2002, p. 465.
"Software as a service", Wikipedia, downloaded Aug. 2, 2014, pp. 1-10.
Tsai, Wei-Tek, et al., "Towards a Scalable and Robust Multi-Tenancy SaaS", Internetware 2010, Suzhou, China, Nov. 3-4, 2010, Article No. 8, pp. 1-15.
Weissman, Craid D., et al., "The Design of the Force.com Multitenant Internet Application Development Platform", SIGMOD Providence, RI, Jun. 29-Jul. 2, 2009, pp. 889-896.
Xue, Wang, et al., "Multiple Sparse Tables Based on Pivot Table for Multi-Tenant Data Storage in SaaS", Proc, of the IEEE Int'l Conf. on Information and Automation, Shenzhen, China, Jun. 2011, pp. 634-637.
Xuxu, Zheng, et al., "A Data Storage Architecture Supporting Multi-Level Customization for SaaS", WISA 2010, Hothot, China, Aug. 20-22, 2010, pp. 106-109.
Yaish, Haitham, et al., "An Elastic Multi-tenant Database Schema for Softare as a Service", DASC 2011, Sydney, NSW, Australia, Dec. 12-14, 2011, pp. 737-743.
PCT Application No. PCT/US2013/046277 International Search Report and Written Opinion mailed Jan. 7, 2014, 10 pages.
PCT Application No. PCT/US2013/046280 International Search Report and Written Opinion mailed Dec. 6, 2013, 6 pages.
U.S. Appl. No. 13/764,384; Final Office Action mailed Oct. 8, 2015, 15 pages.
U.S. Appl. No. 13/764,384; Office Action mailed May 7, 2015, 13 pages.
U.S. Appl. No. 13/764,384; Final Office Action mailed Oct. 9, 2014, 11 pages.
U.S. Appl. No. 13/764,384; Office Action mailed Aug. 14, 2014, 9 pages.
U.S. Appl. No. 13/762,028; Final Office Action mailed May 21, 2015, 21 pages.
U.S. Appl. No. 13/762,028; Office Action mailed Oct. 30, 2014, 18 pages.
U.S. Appl. No. 13/764,173; Office Action mailed Jan. 27, 2015, 7 pages.
U.S. Appl. No. 13/763,520; Office Action mailed Nov. 5, 2015, 7 pages.
U.S. Appl. No. 13/763,520; Final Office Action mailed Apr. 9, 2015, 14 pages.
U.S. Appl. No. 13/763,520; Office Action mailed Nov. 18, 2014, 18 pages.
U.S. Appl. No. 13/764,446; Office Action mailed Feb. 2, 2015, 10 pages.
U.S. Appl. No. 13/764,446; Office Action mailed Sep. 11, 2014, 9 pages.

* cited by examiner

| Before/After | Key | Amount | Start | End | Batch ID | Current |
|---|---|---|---|---|---|---|
| Before Chg | ~~1~~ | ~~500~~ | ~~1/1/1900~~ | ~~12/31/2099~~ | ~~1~~ | ~~Y~~ |
| After Chg | 1 | 500 | 1/1/1900 | 7/31/2012 | 1 | N |
| After Chg | 1 | 1000 | 8/1/2012 | 12/31/2099 | 2 | Y |

FIGURE 4A

| Before/After | Key | Amount | Start | End | Batch ID | Current |
|---|---|---|---|---|---|---|
| Before Rllbk | ~~1~~ | ~~500~~ | ~~1/1/1900~~ | ~~7/31/2099~~ | ~~1~~ | ~~N~~ |
| After Rllbk | ~~1~~ | ~~1000~~ | ~~8/1/2012~~ | ~~12/31/2099~~ | ~~2~~ | ~~Y~~ |
| After Rllbk | 1 | 500 | 1/1/1900 | 12/31/2099 | 1 | Y |

FIGURE 4B

DATA CONSISTENCY AND ROLLBACK FOR CLOUD ANALYTICS

CROSS-REFERENCE TO RELATED APPLICATIONS

The present application is a continuation and claims the priority benefit of U.S. patent application Ser. No. 13/764,446 filed Feb. 11, 2013, now U.S. Pat. No. 9,141,680, the disclosure of which is incorporated herein by reference.

BACKGROUND OF THE INVENTION

Businesses must process large amounts of data to make strategic decisions and be successful. The data is often provided in formats such as reports. To build a meaningful report, businesses are relying on multi-tenanted software as a service (SAAS) analytic companies. Building and providing meaningful analytics typically require a large amount of resources and have a high cost.

In order to reduce cost, more and more businesses are adapting to cloud based SAAS application models. For example, businesses may store sales data in "Salesforce" applications, accounting data in "NetSuite" applications, and billing data in "Zuora" applications. It is important to have detailed information about a company's performance and positions. Unfortunately, analytic applications do not consolidate data from different SAAS applications and provide a single view. Analytic applications also do not provide data consistency within data collection of different data types. What is needed is an improved analytics system that improves upon the analytic systems of the prior art.

SUMMARY OF THE INVENTION

The present system includes an extract-transform-load (ETL) platform which fetches consistent datasets in a batch for a given period of time and provides the ability to rollback that batch. The batch may be fetched for an interval of time, and the ETL platform may fetch new or changed data from different cloud/on-premise applications. It will store this data in the cloud or on-premise to build data history. As the ETL platform fetches new data, the system will not overwrite existing data, but rather will create new versions so that change history is preserved. For any reason, if businesses would like to rollback data, they could rollback to any previous batch.

In an embodiment, a method for collecting data may include collecting a first batch of data by a server from one or more tenant applications and associated with a first period of time. A second batch of data may be collected by the server from the one or more tenant applications and associated with a second period of time subsequent to the first period of time. The second batch of data may be marked as the current batch of data. A rollback event may be detected, and the first batch of data may be marked as the current batch of data after the rollback request.

In an embodiment, a system for collecting data may include a memory, a processor and one or more modules stored in memory and executable by the processor. The modules may be executable to collect a first batch of data from one or more tenant applications and associated with a first period of time, collect a second batch of data from the one or more tenant applications and associated with a second period of time subsequent to the first period of time, and mark the second batch of data as the current batch of data. The modules may further be executable to detect a rollback event and mark the first batch of data as the current batch of data after the rollback request.

BRIEF DESCRIPTION OF THE DRAWINGS

FIG. 4A is an exemplary batch log with a data change.

FIG. 4B is an exemplary batch log with a roll back.

DETAILED DESCRIPTION

The present system includes an ETL platform which fetches consistent datasets in a batch for a given period of time and provides the ability to rollback that batch. The batch may be fetched for an interval of time, and the ETL platform may fetch new or changed data from different cloud/on-premise applications. It will store this data in the cloud or on-premise to build data history. As the ETL platform fetches new data, it will not overwrite existing data, but rather will create new versions so that change history is preserved. For any reason, if businesses would like to rollback data, they could rollback to any previous batch.

The present system has many advantages over the prior art. Though some prior art SAAS analytic providers provide analytics, these systems don't provide history tracking or snapshot trending features. Building analytics with history tracking or snapshot trending feature requires complex ETL and rollback features. Once data is fetched and placed in an SAAS analytics system and a hardware failure occurs at the SAAS application vendor, if SAAS application vendor rolls back its system to some previous point-in-time, data in the SAAS analytic system will become inconsistent with the SAAS application. In this case, the only possible fix is to erase everything in SAAS analytic, re-provision data from SAAS application and erase all history.

Data consistency is also an issue for previous SAAS analytics systems. All SAAS applications provide an API to access their data. However fetching data using their supplied APIs doesn't provide data consistency. For example, when fetching data from Salesforce, it is possible that the process is fetching all accounts at time T1, and then fetching all opportunities at time T10. Fetching all opportunities at time T10 would result in getting new Opportunities created between time T1 and T10 whose account information is not fetched yet. It may result in inconsistent dataset as receiving an opportunity without account information may produce wrong report output.

When the present system restores itself from any failure (Business application/Application integrator/Data Collector/ETL system); the ETL system can automatically restart the data extraction process as it continuously polls a data collection status and looks up for newer successful batches of data based on timestamps. The ETL system can replay the data extraction process from anytime in the past, without any manual intervention required. This auto-restorability and auto-restartability features ensure data consistency. This system ensures complete data isolation for multiple tenants and guarantees consistent delivery to heterogeneous persistence data stores.

Figure 1:
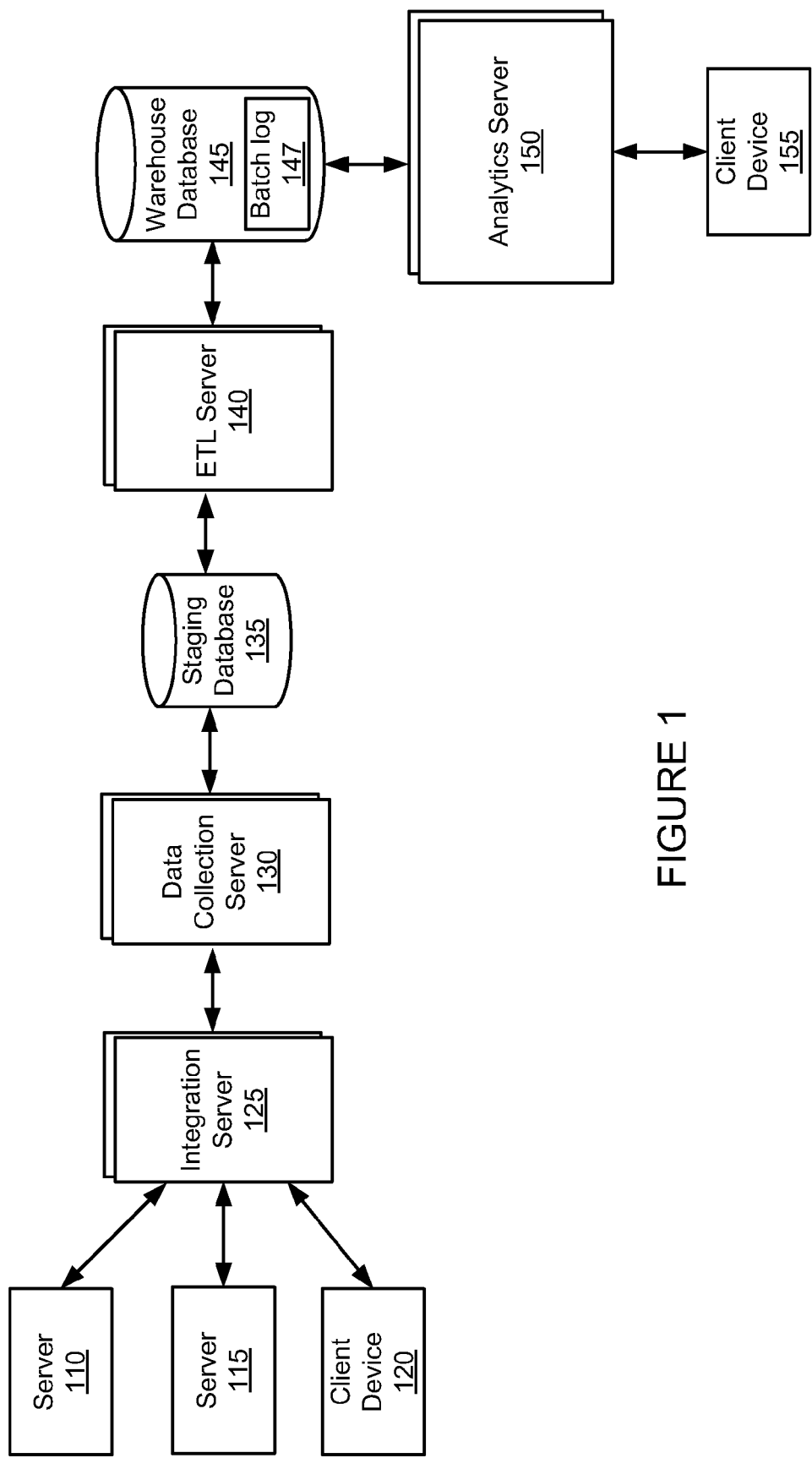
FIG. 1 is a block diagram of an exemplary data analytics system.

FIG. 1 is a block diagram of an exemplary data analytics system. The system of FIG. 1 includes tenant servers 110 and 115, tenant clime 120, integration server 125, data collection server (DCS) 130, staging database 135, extract-transform-load (ETL) server 140, warehouse database 145, analytics server 150 and client device 150. Each of devices 110-155 may communicate with each other over a network (not shown). The network may be implemented as a private network, public network, Wi-Fi network, WAN, LAN, an intranet, the Internet, a cellular network, or a combination of these networks.

Servers 110 and 115 and client device 120 may each be associated with a tenant (client organization) in a multi-tenancy. Each tenant of the multi-tenancy may include one or more servers and client devices. Each server and client may include data to be collected by data collection server 130 via integration server 125. In embodiments, integration server 125 may communicate with different SAAS providers, whether provided from a cloud or a particular machine, and communicate with data collection server 130. Client 120 may be implemented as a desktop, laptop, notebook, tablet computer, smart phone, or some other computing device.

Data collection server 130 may collect data from one or more tenant applications on devices 110-120 through integration server 125 and store the data in a staging database 135. The Data collection server may send batch instructions to integration server 125 in response to receiving a start batch request. Data collection server may provide any portion of the staging data to ETL server 140, for example upon receiving a data request from ETL server 140. When data is collected, it is stored and maintained. Batches of data are not overwritten with newly collected data.

ETL server 140 receives staging data from data collection server 130 and may transform the data to a format more useful to a user. For example, the data transformation may include selecting only certain columns to load into a star format, translating coded values, deriving new calculated values, sorting data, aggregating data, transposing or pivoting data, splitting a column into multiple columns, and other processing. Once data is transformed by ETL server 140, it may be provided to data warehouse 155 for future analytics.

Warehouse database 145 may receive transformed data from ETL server 140 and provide the data to analytics server 150 for processing. When data is loaded into warehouse database 145, the data is stored in a star schema and maintained. Transformed data is not overwritten in warehouse database 145. This allows rollback to previous batches of data if needed. A batch log 147 may be stored at warehouse database 147. The batch log may be updated and maintained to track information about each batch of data and may be used in the rollback of data. The batch log may be stored in table format and may include attributes for each batch such as batch ID, tenant ID, data start date and time, data end date and time, DCS processing status, staging database ID, ETL processing status, and ETL server ID. The DCS processing status and ETL processing status may include not started, in-progress, success and failure. The batch log may be updated by ETL server 140, data collection server 130, and other servers of the system of FIG. 1. Though illustrated as being stored in warehouse database 145, batch log 147 may be stored on another serer or database within the system of FIG. 1.

Analytics server 150 may retrieve transformed data stored in a star schema in data warehouse 155 and perform analytics to the data. The results of the analytics may be provided in the form of charts, graphs, reports or other formats to a user at client device 170.

Though illustrated as one server or one device, each of the servers and clients of the system of FIG. 1 may be implemented using one or more actual or logical machines, servers and client devices. One or more blocks of the system of FIG. 1 may also be combined. Further, though examples of communications are shown using arrows, it is intended and should be understood that each of the servers and clients in the system of FIG. 1 may communicate over network, and therefore with each other.

Figure 2:
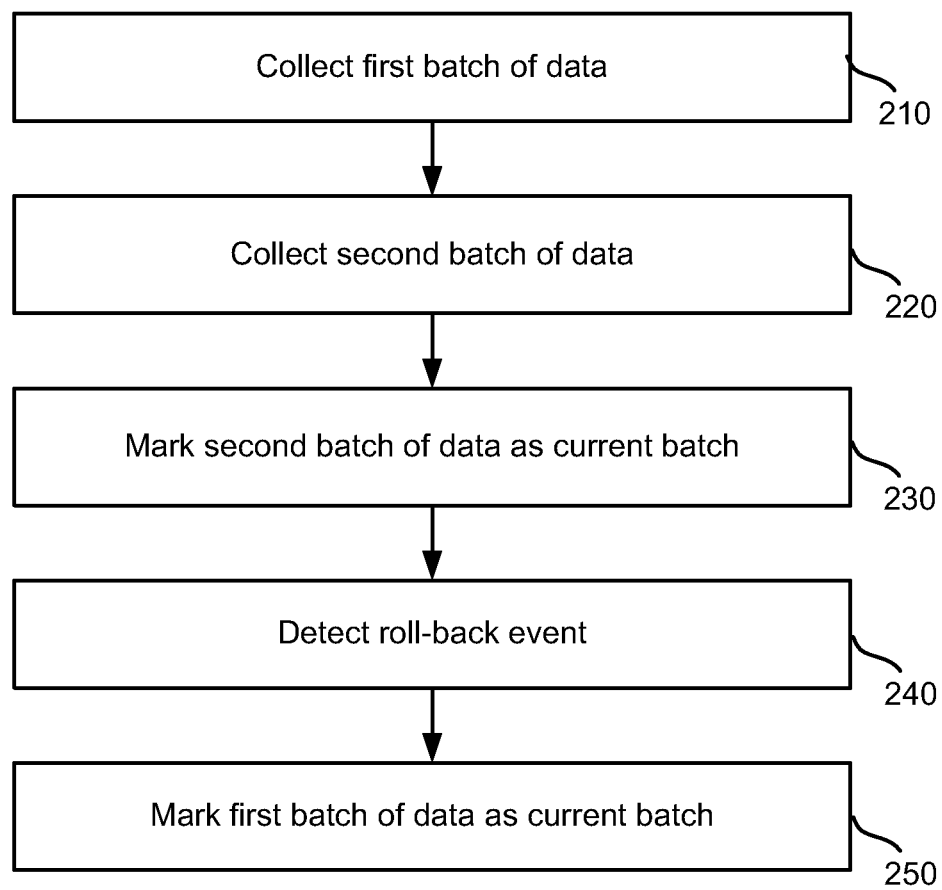
FIG. 2 is an exemplary method for performing a rollback of data.

FIG. 2 is an exemplary method for performing a rollback of data. A first batch of data is collected at step 210. The batch of data may be collected for a period of time by data collection serve 130 from tenant devices 110-120 via integration server 125. A batch log may be updated during and after the batch data collection, and the collected data is marked with the batch ID information. Collecting a first batch of data is discussed in more detail below with respect to the method of FIG. 3.

After a batch of data is collected, the batch may be stored or "staged" at staging database 135. Once staged, the batch may be transformed at ETL server 140. ETL server 140 performs transformation functions per batch. The transformed batch of data is then provided to warehouse database 145. Analytics server 150 may access transformed data at warehouse database 145 to generate charts, graphs, reports and other tools for analyzing the transformed data.

A second batch of data is collected at step 220. The second batch of data may include the same data objects as the first batch (sales information, opportunity information, and so forth), but will cover a different period of time. In some embodiments, the second batch will automatically include data with a start time just after the end time of the previous successful batch. Collecting a second batch of data is performed as described with respect to FIG. 3. The second batch of data may be staged in staging database 135 without overwriting or deleting the first batch or any other batch. Similarly, when the second batch is transformed and stored in warehouse database 145, no other data is overwritten or deleted when the second batch of data is stored.

The second batch is marked as the current batch at step 230. The batch may be marked as the current batch in the batch log 147. The second batch is the most up to date batch and will likely be used for performing analytics. An example of a batch log having a second batch marked as the current batch is provided in FIG. 4A.

A rollback event is detected at step 240. A rollback event may include receiving input from a user that a rollback should be performed. For example, an administrator may determine that the most current batch should not be used, and may request a rollback to the previous batch. A rollback event may also include an automated event not initiated from a user. For example, if a data load into warehouse database 145 fails, a rollback event may be automatically triggered by the failure.

Upon detecting a rollback event, a first batch (i.e., previous successful batch) is designated as the current batch at step 250. In some embodiments, the current batch information is deleted from the batch log 147 and the previous batch is marked as the current batch. An example of a batch log reflecting a rollback is illustrated in FIG. 4B.

Figure 3:
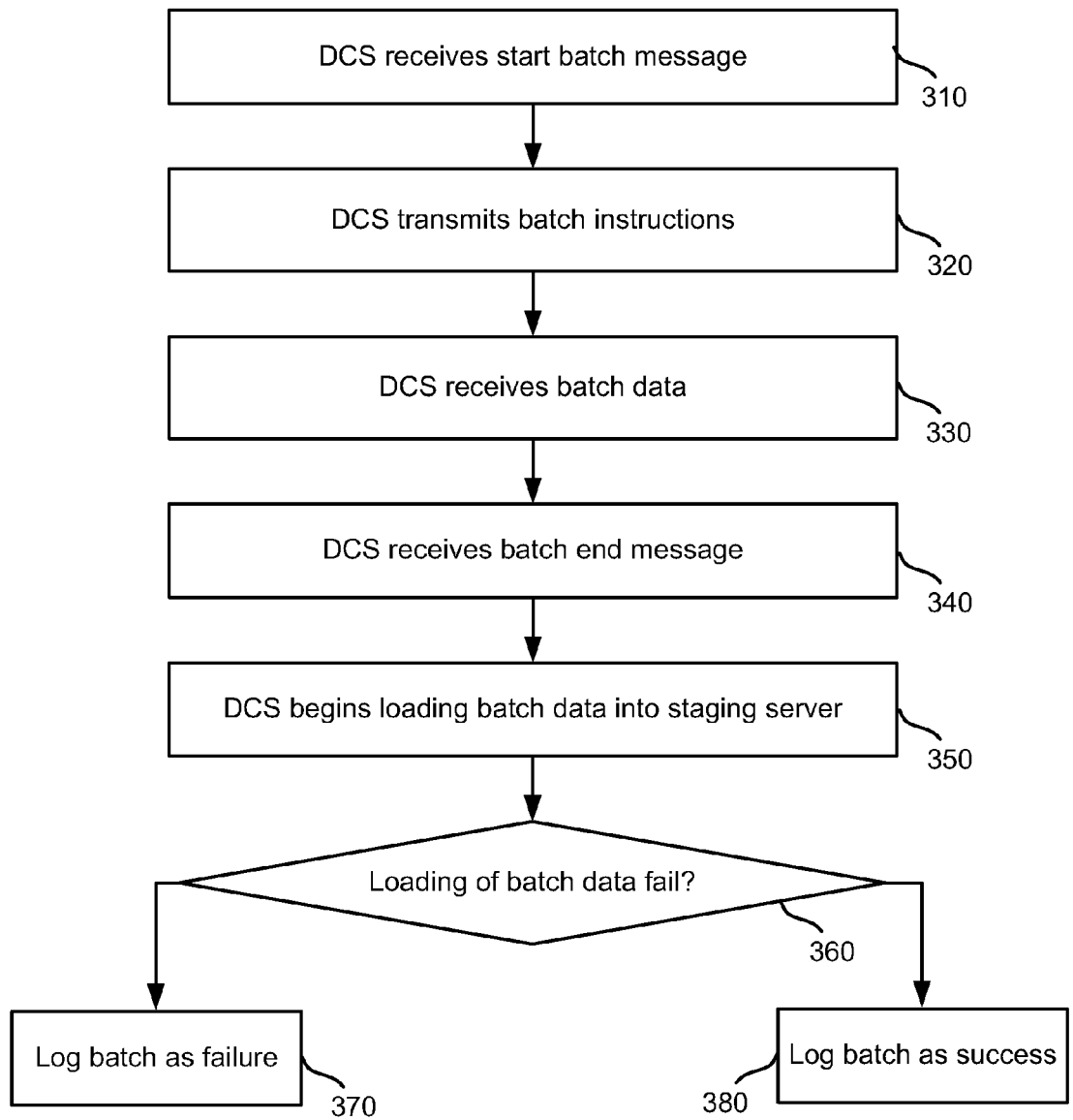
FIG. 3 is an exemplary method for collecting a batch of data.

FIG. 3 is an exemplary method for collecting a batch of data. The DCS 130 receives a start batch message from integration server 125 at step 310. The start batch message may be received periodically or initiated by the integration serer 125 in response to a user request.

In response to the request, the DCS 130 transmits batch instructions to integration server 125 at step 320. The batch instructions may indicate the data start time and date, data end time and date, the data to be collected, and the batch ID. For example, the batch instructions may indicate to collect employee records, sales records, and revenue records created or changed during a time period of Jan. 1, 2013 at 8:00 AM to Jan. 1, 2013 at 10:00 AM, and to call the data batch no. 001. The batch log may be updated by DCS 130 to indicate the batch ID and that DCS processing of the batch is "not started."

DCS 130 receives batch data at step 330. In some embodiments, DCS 130 may receive all batch data requested, a portion of the data, or none of the data. While data is received from integration server 125 by DCS 130, the DCS processing status may indicate "in-progress." Once the batch data has been provided to DCS server 130, integration server 125 provides a batch end message to DCS 130 at step 340. The request for a batch of data may specify that all new data and changed data maintained by a tenant be collected. If no tenant data has changed or been updated for the specified period of time, no data will be provided and no new batch is created.

DCS sever 130 may stage the collected data for the batch in staging database 135 at step 350. A determination is then made by DCS 130 if the batch data staging has failed or succeeded. The batch data staging is marked as "successful" in batch log 147 at step 380 if all batch data received by DCS 130 is staged or loaded into staging database 135. If any portion of the batch data is not loaded into staging database 135, the batch status is set to "failure" at step 370. If a batch is listed as a failure, the batch is removed from the batch log and the next batch will attempt to collect the same data for the same time period. In some embodiments, the batch log may be updated by script generated and executed by DCS 130, ETL 135 or other parts of the system of FIG. 1.

FIG. 4A is an exemplary batch log with a data change. The batch table of FIG. 4A include seven columns with headings of "Before/After", "Key", "Amount", "Start", "End", "Batch ID", and "Current." The Key through current record columns may be added to all data stored in staging database 135 and warehouse database 145. In the example of FIG. 4A, an opportunity in the batch data has changed from $500 to $1,000. In the original batch collection, the key has a value of 1, the amount of the opportunity is 500, the batch data starts at Jan. 1, 1900 and ends at Dec. 31, 2099, the data has a batch ID of 1 and is marked as the current data.

After a change that occurs on Aug. 1, 2012 is detected, the original batch of row 1 is replaced (hence, the strikeout of the data in row 1) and is replaced with two batches, as indicated in the second row and third row of data in the log. The second row of data indicates that the business key is 1, the amount is 500, the data begins on Jan. 1, 1900 and ends at Jul. 31, 2012, the batch ID is 1 and that the batch is not the current record. The third column indicates a business key of 1, an amount of 1000, a start date of Aug. 1, 2012, an end date of Dec. 31, 2099, a batch ID of 2 and that the batch is the current record.

FIG. 4B is an exemplary batch log with a roll back. The columns in FIG. 4B have the same headings as those in the batch log of FIG. 4A. FIG. 4B illustrates a batch log in the case of a rollback that causes the current record to be changed to batch ID 1 from batch ID 2. The first two rows of the batch log in FIG. 4B match the last two rows of the batch log from FIG. 4A. Both rows are replaced (hence, the strikethrough), with the first row from FIG. 4A, which is now made the current record.

Figure 5:
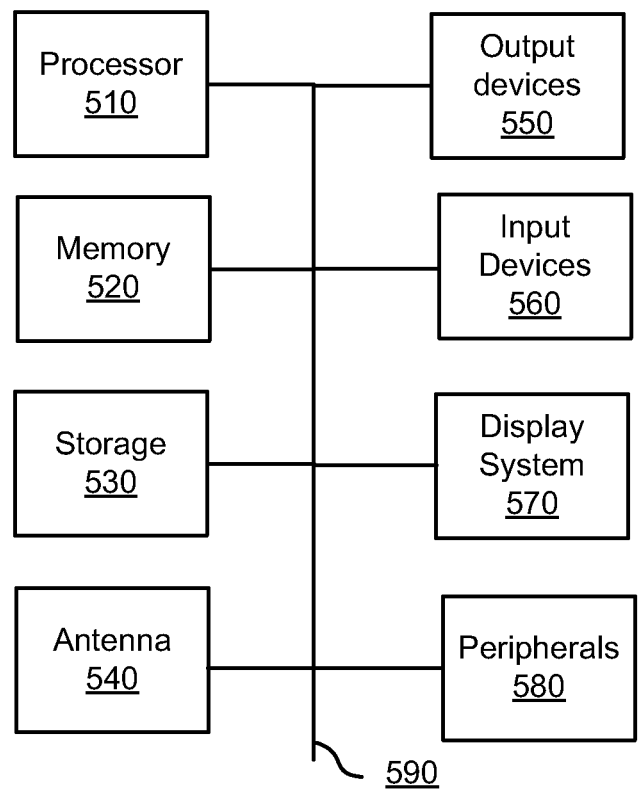
FIG. 5 is a block diagram of a device for implementing the present technology.

FIG. 5 is a block diagram of a device for implementing the present technology. FIG. 5 illustrates an exemplary computing system 500 that may be used to implement a computing device for use with the present technology. System 500 of FIG. 5 may be implemented in the contexts of the likes includes tenant servers 110 and 115, tenant clime 120, integration server 125, DCS 130, staging database 135, ETL server 140, warehouse database 145, analytics server 150 and client device 150. The computing system 500 of FIG. 5 includes one or more processors 510 and memory 520. Main memory 520 may store, in part, instructions and data for execution by processor 510. Main memory can store the executable code when in operation. The system 500 of FIG. 5 further includes a storage 520, which may include mass storage and portable storage, antenna 540, output devices 550, user input devices 560, a display system 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the storage 530, peripheral device(s) 580 and display system 570 may be connected via one or more input/output (I/O) buses.

Storage device 530, which may include mass storage implemented with a magnetic disk drive or an optical disk drive, may be a non-volatile storage device for storing data and instructions for use by processor unit 510. Storage device 530 can store the system software for implementing embodiments of the present invention for purposes of loading that software into main memory 510.

Portable storage device of storage 530 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device.

Antenna 540 may include one or more antennas for communicating wirelessly with another device. Antenna 516 may be used, for example, to communicate wirelessly via Wi-Fi, Bluetooth, with a cellular network, or with other wireless protocols and systems. The one or more antennas may be controlled by a processor 510, which may include a controller, to transmit and receive wireless signals. For example, processor 510 execute programs stored in memory 512 to control antenna 540 transmit a wireless signal to a cellular network and receive a wireless signal from a cellular network.

The system 500 as shown in FIG. 5 includes output devices 550 and input device 560. Examples of suitable output devices include speakers, printers, network interfaces, and monitors. Input devices 560 may include a touch screen, microphone, accelerometers, a camera, and other device. Input devices 560 may include an alpha-numeric keypad, such as a keyboard, for inputting alpha-numeric and other information, or a pointing device, such as a mouse, a trackball, stylus, or cursor direction keys.

Display system 570 may include a liquid crystal display (LCD), LED display, or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for retrieving consistent datasets, comprising:
   a staging database for storing batches of data corresponding to a period of time, wherein a batch of data includes one or more distinct datasets; and
   a plurality of tenant devices, wherein each tenant device of the plurality of tenant devices includes a processor that executes instructions stored in memory to:
   collect a current batch of data associated with a first period of time from one or more sources, wherein collection of the first batch of data includes instructions to collect new or changed data compared to a marked current batch of data that has been previously stored in memory,
   assign identification information for the collected current batch of data, wherein the collected current collected current batch of data includes at least one new or changed dataset compared to the marked current batch of data that is previously stored in a batch log,
   store the collected current batch of data in the staging database, wherein the stored current batch of data does not overwrite previously stored batches of data listed in the batch log, and wherein a location associated with the stored current batch of data is updated in the batch log,
   mark the collected current batch of data as the current batch of data in the batch log,
   detect a rollback event, wherein the rollback event indicates that the marked current batch of data should not be used,
   select a previously stored batch of data as the current batch using the batch log, wherein information for the previously stored batch of data is included in the batch log,
   retrieve the previously stored batch of data from the staging database using the identification information in the batch log, wherein the retrieved previously stored batch of data is used to overwrite the first batch of data, and
   deleting information pertaining to the first batch of data from the batch log.

2. The system of claim 1, wherein the collected batches of data from the one or more sources corresponds with one or more applications associated with the tenant.

3. The system of claim 1, wherein the current batch of data and the previously stored batches of data include the same data objects.

4. The system of claim 1, wherein the detected rollback event corresponds to an automated event.

5. The system of claim 4, wherein the automated event includes a generated failure output if a batch of data cannot be stored in memory.

6. The system of claim 1, wherein collection of the current batch of data from the one or more sources includes instructions that indicates the period of time associated with the data to be collected and what data is to be collected.

7. The system of claim 1, wherein collection of the current batch of data from the one or more sources includes updating the batch log with a status associated with the collection.

8. The system of claim 7, wherein the collection status updated in the batch log includes "not started", "in-progress", "successful", and "failure".

* * * * *